Dec. 12, 1961  D. M. WILLIAMSON  3,012,682
BALED HAYSTACK HAULING, LOADING AND UNLOADING MACHINE
Filed Jan. 25, 1960  4 Sheets-Sheet 1

INVENTOR.
DARYLD M. WILLIAMSON
BY
ATTORNEY

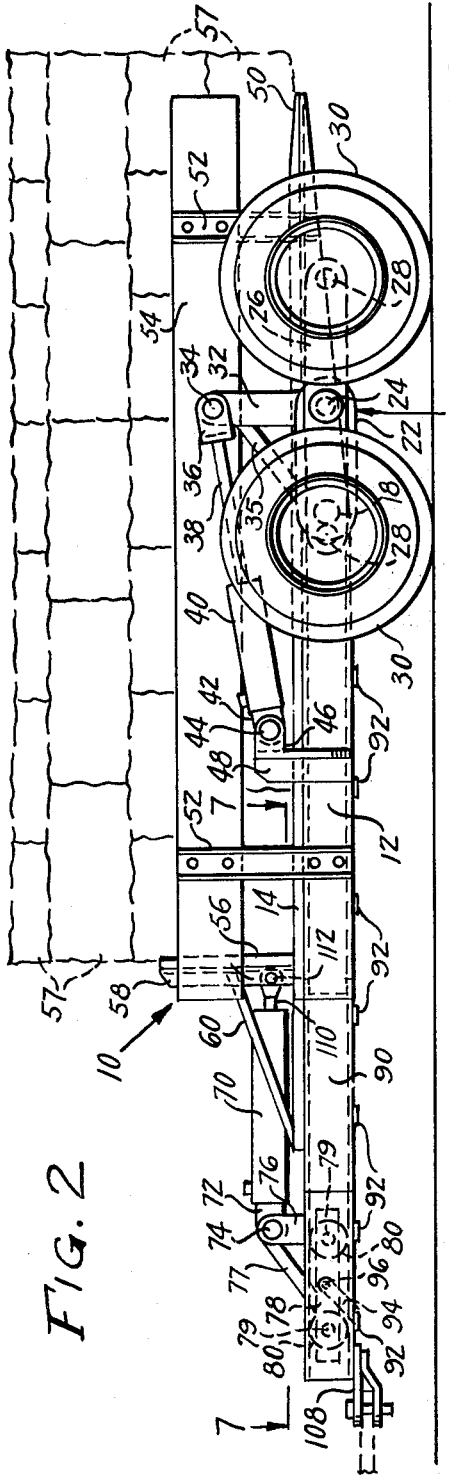

Dec. 12, 1961 D. M. WILLIAMSON 3,012,682
BALED HAYSTACK HAULING, LOADING AND UNLOADING MACHINE
Filed Jan. 25, 1960 4 Sheets-Sheet 3
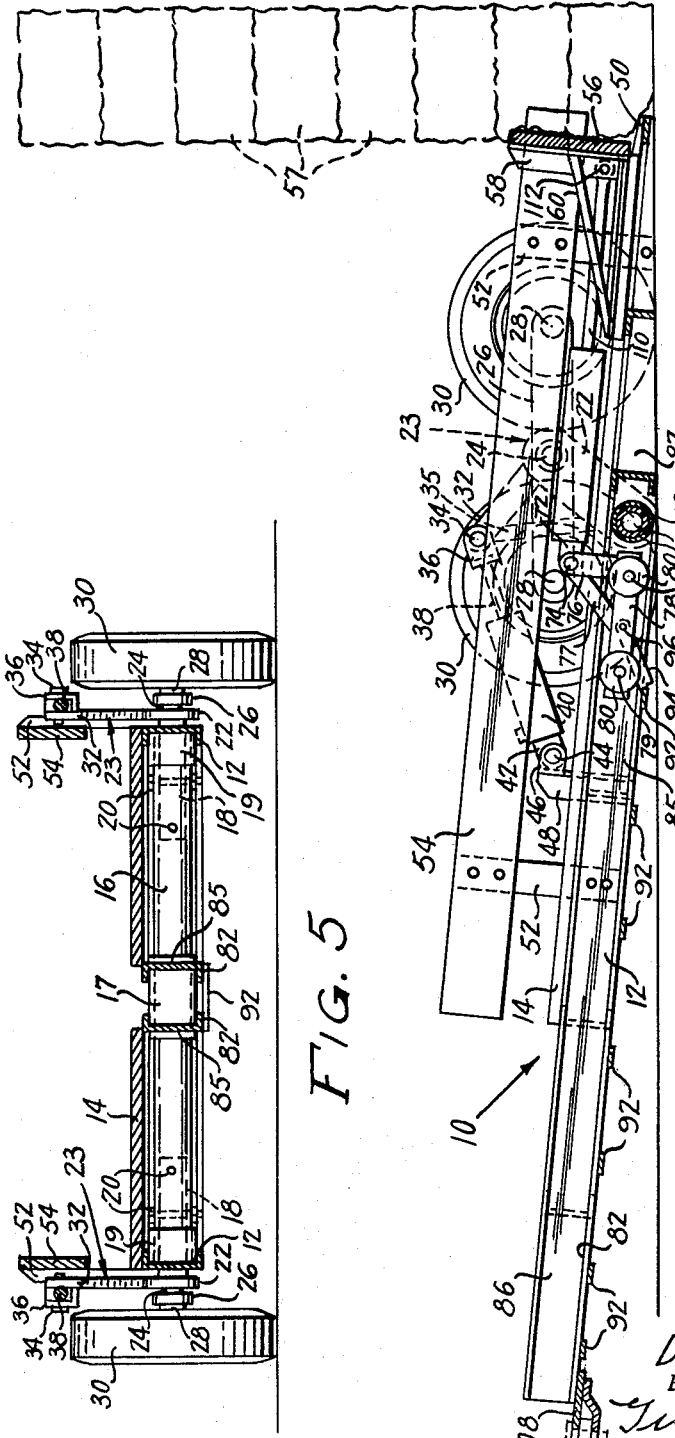
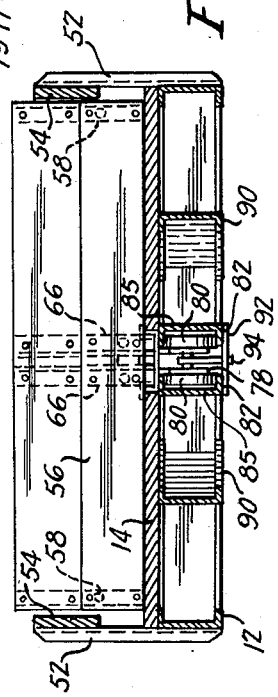
INVENTOR.
DARYLD M. WILLIAMSON
BY
*Gustave Miller*
ATTORNEY

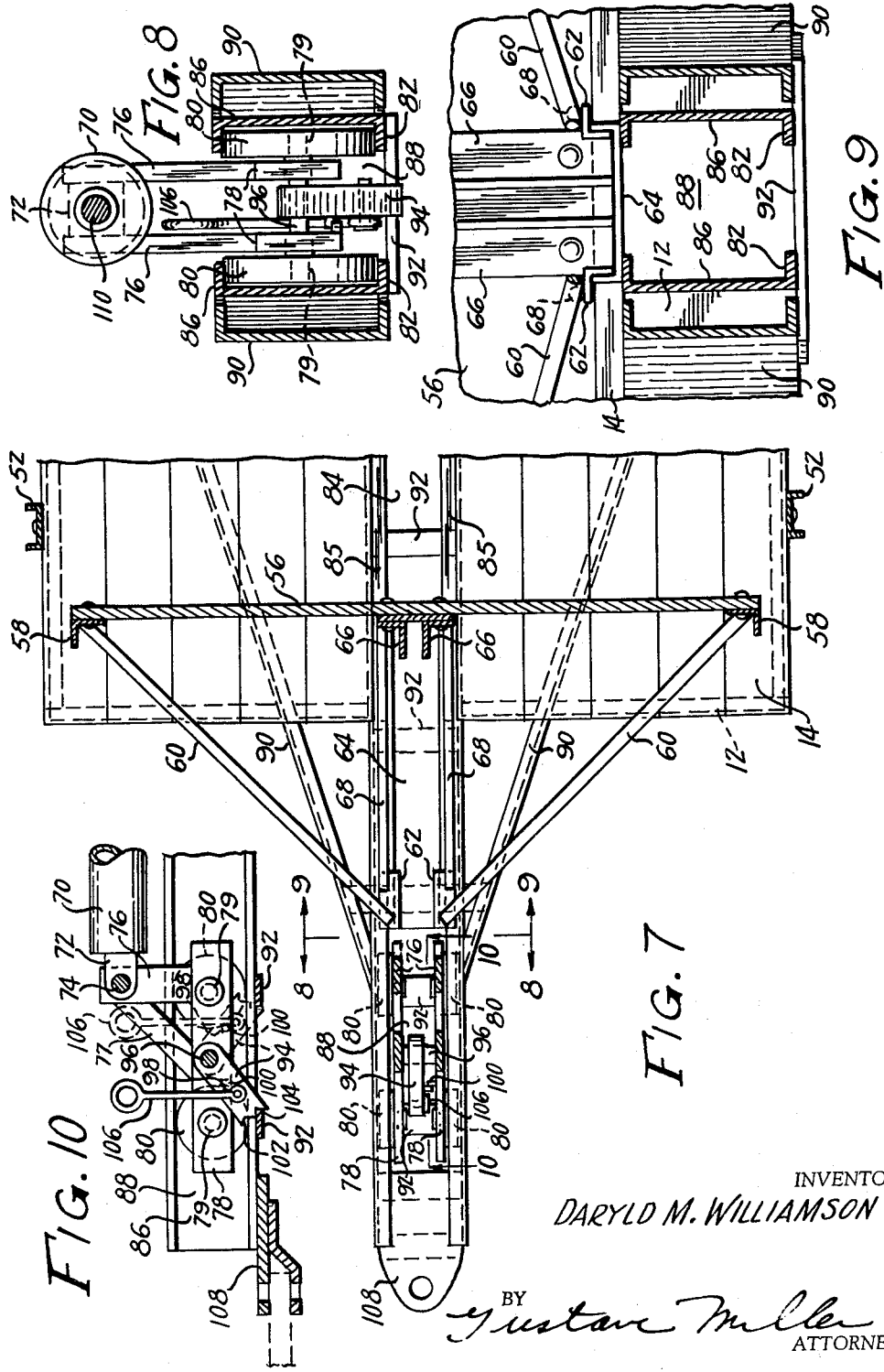

United States Patent Office 3,012,682
Patented Dec. 12, 1961

3,012,682
BALED HAYSTACK HAULING, LOADING AND UNLOADING MACHINE
Daryld M. Williamson, P.O. Box 76, Vale, S. Dak.
Filed Jan. 25, 1960, Ser. No. 4,333
8 Claims. (Cl. 214—82)

This invention relates to a trailer for moving baled haystacks or the like from one position to another, and it particularly relates to a trailer of the aforesaid type which is adapted to unload and reload the baled haystack by mechanical means forming a part of the trailer.

Heretofore, it was usually necessary for the farmer to load the trailer either by hand or by a conventional hydraulic stacker or bale loader so as to make a stack of baled hay as long and as wide as the trailer bed permits and as high as the farmer desired. The loaded trailer was then moved by a farm tractor to the desired unloading position where it was necessary to manually unload the hay or unload it by other mechanisms.

The above-described manual process was tedious, hazardous and uneconomical insofar as it resulted in both waste of labor and waste of time. In order to overcome these difficulties, it was proposed to provide a self-unloading trailer having a mechanically-operated pusher element which could push the haystack load off the back end of the trailer. However, such prior type of mechanical unloader utilized either chain and sprocket actuating means or similar means which were inadequate for the job because of the many moving parts subject to damage, and because under the load and stress conditions encountered, chains and the like were always in danger of snapping. The snapping of a chain or the failure of a part could cause not only upsetting of the load but great damage to the trailer and injury to the operator.

It is one object of the present invention to provide a self-unloading and reloading baled haystack trailer which accomplishes all the desired advantages of mechanical operation but which is not subject to the disadvantages of damage under stress and strain in operation.

Another object of the present invention is to provide a hay trailer of the aforesaid type which is relatively simple in construction and easy to manipulate.

Other objects of the present invention are to provide an improved hay trailer, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

FIG. 2 is a side elevational view of the device of FIG. 1 in position to carry a load.

FIG. 3 is a side elevational view similar to FIG. 2 but showing the device in the unloading position.

FIG. 4 is a sectional view taken on line 4—4 of FIG. 1, but showing the operating mechanism in the unloading position.

FIG. 5 is a sectional view taken on line 5—5 of FIG. 1.

FIG. 6 is a sectional view taken on line 6—6 of FIG. 1.

FIG. 7 is a sectional view taken on line 7—7 of FIG. 2.

FIG. 8 is a sectional view taken on line 8—8 of FIG. 7.

FIG. 9 is a sectional view taken on line 9—9 of FIG. 7.

FIG. 10 is a sectional view taken on line 10—10 of FIG. 7.

Figure 1:
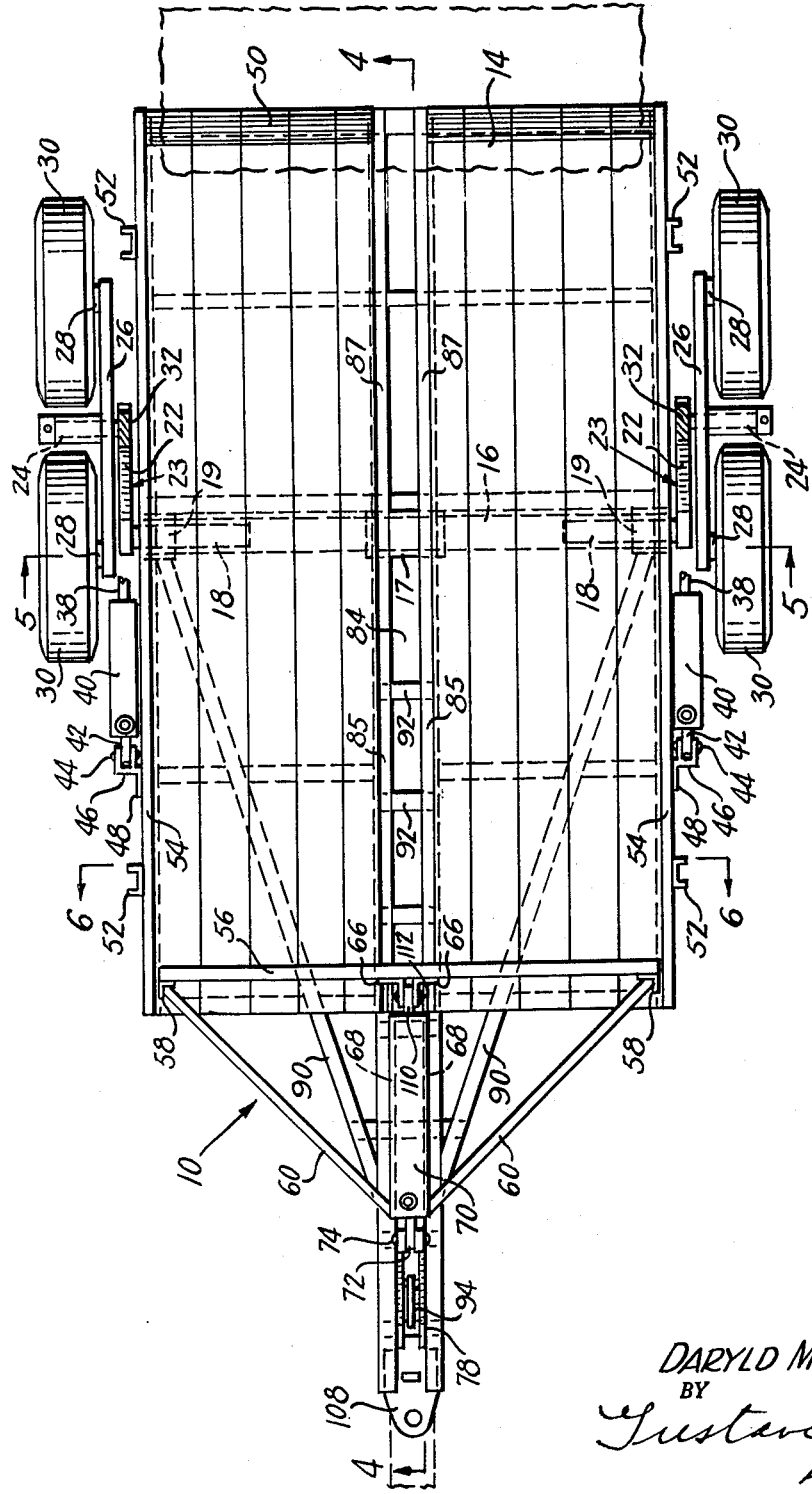
FIG. 1 is a top plan view of a device embodying the present invention.

Referring in greater detail to the drawings wherein similar reference characters refer to similar parts, there is shown a trailer, generally designated 10, comprising a rectangular frame 12 having a covering of heavy slats 14 thereon forming the floor-boards.

The frame 12 is centrally supported by a main axle 16 extending transversely thereof and being of tubular construction. The axle 16 extends through a center sleeve 17 and two end sleeves 19. The center sleeve 17 extends through and is fixed in the channel member U-bars 85 as shown in FIGS. 1 and 5. This main axle 16 telescopically receives a shaft 18 at each end, each shaft 18 being pinned to the axle 16 by pins 20.

To each shaft 18 is connected one end of a lever arm 22 forming one leg of a triangular frame 23 while on the opposite end of each lever arm 22 is mounted an auxiliary shaft 24. Each shaft 24 rockably supports a tandem arm 26. Each arm 26 is provided with an axle 28 at each end thereof and on each axle 28 is journaled a rotatable wheel 30.

A second leg 32 of the triangular frame 23 is secured at one end to lever arm leg 22 while at its other end, the link leg 32 and the triangular frame is pivoted at 34 to a bifurcated bracket 36. A third brace leg 35 fixed to legs 22 and 32 complete the triangular frame 23. The bracket 36 is connected to the free end of a piston rod 38 which is provided with a piston head (not shown). Obviously, the bracket 36 might be fixed to the end of leg 32, with the pivot 34 still extending through the bracket 36 and the end of piston rod 38. The piston head is slidably positioned within a fluid pressure cylinder 40. The closed end of the cylinder 40 is provided with an ear 42 pivoted at 44 to a bracket 46 mounted on a standard 48 extending up from the frame 12. The cylinder 40 is preferably provided with two inlets, one on either side of the piston head. These inlets are connected through a three-way valve to a source of fluid pressure usually in the tractor, in the ordinary manner. Since the valved fluid pressure system utilizing a three-way selector valve is common on many tractors, it has not been illustrated in the drawings. Furthermore, the valve may be actuated in any manner desired, either manually or electrically through a solenoid or mechanically through appropriate lever or rod systems, all of standard design.

It is also possible to use only one connection from behind the piston valve in the cylinder 40 to the source (not shown). In such case, when the pressure is withdrawn, the piston will automatically be withdrawn into the cylinder because of gravity. In addition, it is possible to use a spring on one side of the piston head within the cylinder and fluid pressure on the other so that when the pressure is withdrawn, the spring will urge the piston rod back in the cylinder.

The term fluid pressure, as used above, relates to both hydraulic and pneumatic pressure, although hydraulic pressure is generally preferred.

The rear edge of the frame 12 is tapered, as at 50 so that when the frame 12 is lowered at the rear (as in FIGS. 3 and 4), a loading and unloading ramp is provided.

The frame 12 is provided with a plurality of supporting stanchions 52 on opposite longitudinal sides of the trailer. Side rails 54 are riveted, bolted or otherwise secured to these stanchions 52.

In the operation of the structure so far described, when it is desired to load or unload the trailer, the fluid pressure system is operated to withdraw the piston rod 38 into the cylinder 40 by withdrawing the fluid pressure from behind the piston head in the cylinder. This withdrawal of the rod 38 pivots the triangular frame consisting of legs 22, 32 and 35 forwardly about tandem arm shaft 24 and down and this, in turn, causes the triangular frame 23 to pivot into the position shown in FIGS. 3 and 4. In this position, the rear end of the trailer body frame is lowered.

When the trailer 10 has been loaded or unloaded, it is brought back into movable position by operating the fluid pressure system to push out the piston rod 38. This pivots the triangular frames 23 with link legs 32 and the lever arm legs 22 back into the position shown in FIG. 2 and lifts up the rear edge of the trailer into the straight horizontal position. The fluid pressure system and the linkage of the triangular frame 23 is retained in this position until it is again desired to lower the rear edge of the trailer.

In order to mechanically push a load off the trailer while its rear edge is lowered, there is provided a pusher device comprising a transverse pusher bar 56 having about the height of two bales of hay 57, or at least, substantially more than the height of one bale 57, movable across the floor-boards 14. The pusher bar 56 is provided on its front face, adjacent each end, with an angle iron brace 58 to which are connected rods 60. These rods 60 incline downwardly inwardly as they extend forwardly and are connected at their forward ends to corresponding bracket portions 62 on a movable platform 64 (see FIG. 7).

At the center of the front face of bar 56 are a pair of angle iron braces 66, each having one end of a corresponding rod 68 connected thereto. The rods 68 extend forwardly in parallel relation and are also connected at their forward ends to the bracket portions 62.

A double acting fluid pressure cylinder 70 is provided with an extension ear 72 pivoted at 74 to standards 76 extending up from corresponding support members 78 which together with angle braces 77 form a carriage. These support members 78 also support a pair of axles 79 for the two pairs of rollers 80. These pairs of rollers 80 are movable on a pair of tracks 82 on the bottom of a central longitudinal channel 84 extending lengthwise of the floor-board 14 as far as the axle shaft 16 and sleeve 17. The channel 84 is provided by two inwardly facing U-bars 85, which however are tapered at 87 rearwardly from axle 18 to the rear edge 50 of the trailer frame 12, the tapered bars 87 and channel member bars 85 and 86 providing a strong supporting truss for the frame 12.

The channel 84 is extended by means of forward extension U-bars 86 having a mating channel 88. The extension U-bars 86 are braced by means of brace U-bars 90.

The bottom of channel 84 and the bottom of channel 88 are open but are provided with a continuous series of spaced push bars 92. These push bars are adapted to coact with a ratchet pawl 94 pivoted at 96 between the support members 78 of the carriage. The pawl 94 is provided with a stop 98 adapted to coact with a stop 100 on the carriage to limit pivotal movement of the pawl. A similar stop 100 is provided on the carriage on the opposite side of pivotal movement of the pawl 94 to limit movement of the pawl in the opposite direction (as indicated in dotted outline in FIG. 10).

The pawl 94 is provided with two recesses 102 and 104 adapted to coact with the push bars 92 in forming a ratchet mechanism. The pawl 94 is adapted to be placed in either of two opposite positions (as indicated in full line and in dotted line positions in FIG. 10) depending on the desired direction of movement of the pusher bars 56, by means of a handle 106 pivotally connected to the pawl for the purpose of moving the pawl to one or the other of its alternate positions.

As mentioned above, this type of trailer is constructed to be hitched to a prime mover such as a farm tractor or the like. For this purpose, the front end of extension 86 is provided with a hitching bar 108 for connection to the prime mover.

The cylinder 70 is a fluid pressure cylinder that may be similar to that shown at 40 and is similarly connected to a fluid pressure system, hydraulic or pneumatic, for actuation of a piston head (not shown) to which is connected a piston rod 110. The piston rod 110 is pivotally connected at 112 to the pusher bar 56. The fluid pressure system connected to cylinder 70 is, of course, double acting and may be identical to that connected to cylinders 40.

In operation, when the trailer is loaded and it is desired to unload it, the fluid pressure behind the piston heads in the cylinders 40 is relieved to permit the rods 38 to retract. This pivots the triangular frame 23, with its leg links 32 and leg lever arms 22 causing the rear portion of the trailer to lower while the front portion is retained in the upper position by means of the hitching bar 108 hitched to a tractor or the like.

With the trailer in the above-described position wherein its rear end is lowered, fluid pressure is applied behind the piston head in cylinder 70 while the pawl 94 is in the position shown in full line in FIG. 10. This extends the piston rod 110 a full stroke with a consequent rearward movement of pusher bar 56. During this movement of the piston rod 110, opposite movement of the cylinder 70 is prevented by engagement of recess 104 of pawl 94 with the corresponding push bar 92. Upon reversal of the pressure in the cylinder 70, the piston rod 110 is retracted into the cylinder 70 and tends to move the cylinder 70 in the rearward direction. This causes the pawl 94 to rock out of engagement with the push bar 92 with which it was engaged and to move toward the rear of the trailer until its recess 104 becomes engaged with the next push bar 92. This ratcheting movement caused by extension and retraction of the piston rod 110 continues until the pusher bar 56 has pushed the load off the rear edge of the trailer. During the process as the load passes over the rear edge of the trailer, it is merely necessary to move the trailer forwardly correspondingly from under the load which then drops easily to the ground.

If the load is on the ground and it is desired to load it onto the trailer by mechanical means, a cable or the like is engaged to or looped around a false end gate similar to pusher bar 56 behind the lower two bales 57 and this cable is then secured to the pusher bar 56 while the pusher bar is at the rear edge of the trailer. The pawl 94 is then reversed into the position shown in dotted outline in FIG. 10.

With the device set up as above, the fluid pressure system is actuated in the reverse manner of that described above and the pusher bar 56 is then ratcheted back toward the front of the trailer. As it moves forwardly, the pusher bar 56 pulls the load onto the trailer while the trailer is correspondingly backed under the load so that when the pusher bar is at the extreme forward end of the trailer, the load is fully in position. The cylinders 40 are then actuated to lift the rear end of the trailer to the horizontally straight position and the trailer is then ready to be moved.

Although this invention has been described in considerable detail, such description is intended as being illustrative rather than limiting since the invention may be variously embodied, and the scope of the invention is to be determined as claimed.

Having thus set forth and disclosed the nature of this invention, what is claimed is:

1. A self-loading and unloading trailer comprising a frame having a floor-board thereon, tandem wheels on opposite sides of said frame, said tandem wheels having axles journaled through opposite ends of a tandem bar, linkage means pivoted to said frame and to an intermediate point of said tandem arm supporting the frame, a tapered rear edge on said frame, an extension on the front edge of said frame, a hitching means on said extension, fluid-pressure actuated means operatively connected to said frame and to said pivoted linkage means for raising and lowering said rear edge, inwardly facing U-bars mounted on said frame providing a longitudinal channel forming means arranged centrally of said frame and mating with a channel forming means in said extension, said channels having a continuous track means provided by channel member U-bars, a carriage movable along said channels, spaced push bars fixed in said channels, a pawl on said carriage coacting with said push bars to form a ratchet mechanism, a fluid pressure cylinder on said carriage, a piston rod extending out of said cylinder, and a pusher bar extending transversely of said floor-board and being connected to said piston rod arranged to be actuated by a fluid pressure actuating system operatively connected to said cylinder.

2. The trailer of claim 1, said pawl being adjustable into two alternative positions on said carriage and said pawl being provided with two recesses, each recess being alternatively engageable with opposite sides of said push bars.

3. The trailer of claim 2 said pawl being pivotally connected to said carriage and provided with a stop adapted to alternatively engage with oppositely positioned stops on said carriage depending on the pivotal condition of the pawl.

4. The trailer of claim 1, said fluid pressure actuated means for raising and lowering said rear edge comprising a pair of fluid pressure cylinders, one on each of two opposite sides of the frame, each cylinder having a piston rod operatively connected to said linkage means which is, in turn, operatively connected to said trailer frame.

5. A self-loading and unloading trailer comprising a frame having a front end, a rear end and opposite longitudinal sides, at least one fluid pressure cylinder pivotally connected to said trailer frame and having a fluid pressure system operatively connected thereto, a piston rod extending out of said cylinder and being pivotally connected to a linkage frame, a transverse frame axle on said trailer frame, tandem wheels on opposite sides of said frame having wheel axles journaled through opposite ends of a tandem arm and operatively connected to said frame axle, said linkage frame being connected to said frame axle and to said tandem wheels arms for pivotal movement therebetween whereby it may raise and lower said trailer frame in accordance with the position of said piston rod, a pusher bar extending transversely across said frame, and fluid-pressure actuated ratchet means operatively connected to said pusher bar for moving said pusher bar longitudinally of said trailer frame.

6. The trailer of claim 5 wherein said ratchet means comprises a carriage having a pawl thereon, a longitudinal channel means on said frame, said carriage being movable in said channel means, a series of spaced push bars in said channel means, said pawl being releasably engageable with each of said push bars, a fluid-pressure cylinder on said carriage, a piston rod extending outwardly of said cylinder arranged to be connected to a pressure system, said piston rod being connected to said pusher bar.

7. The trailer of claim 5, said trailer frame being provided with a front extension, said ratchet means being movable from said front extension to said frame, and a hitching means on said front extension.

8. The trailer of claim 5, the rear portion of said trailer frame rearwardly of said axle being tapered in thickness.

References Cited in the file of this patent

UNITED STATES PATENTS

| | | |
|---|---|---|
| 2,657,009 | Neis et al. | Oct. 27, 1953 |
| 2,714,968 | Babcock | Aug. 9, 1955 |
| 2,748,965 | Grey | June 5, 1956 |